United States Patent
Maruyama et al.

(10) Patent No.: US 7,875,209 B2
(45) Date of Patent: Jan. 25, 2011

(54) PHOTOVOLTAIC DEVICE COMPRISING CONDUCTIVE POLYANILINE

(75) Inventors: Tsukasa Maruyama, Hiratsuka (JP); Yuko Sekine, Hiratsuka (JP)

(73) Assignee: The Yokohama Rubber Co., Ltd., Tokyo (JP)

(*) Notice: Subject to any disclaimer, the term of this patent is extended or adjusted under 35 U.S.C. 154(b) by 520 days.

(21) Appl. No.: 12/032,896

(22) Filed: Feb. 18, 2008

(65) Prior Publication Data
US 2008/0142074 A1   Jun. 19, 2008

Related U.S. Application Data

(60) Division of application No. 11/092,921, filed on Mar. 30, 2005, now Pat. No. 7,351,359, which is a continuation-in-part of application No. PCT/JP2004/015203, filed on Oct. 7, 2004.

(30) Foreign Application Priority Data

| Oct. 8, 2003 | (JP) | 2003-349793 |
| Mar. 31, 2004 | (JP) | 2004-105439 |
| Apr. 16, 2004 | (JP) | 2004-121943 |

(51) Int. Cl.
H01B 1/00 (2006.01)
H01L 31/00 (2006.01)
C08G 73/00 (2006.01)

(52) U.S. Cl. .................. 252/500; 136/252; 528/422
(58) Field of Classification Search .......... 252/500; 136/252; 528/422
See application file for complete search history.

(56) References Cited

U.S. PATENT DOCUMENTS

| 5,008,041 A * | 4/1991 | Cameron et al. ............ 252/500 |
| 5,232,631 A | 8/1993 | Cao et al. |
| 5,716,550 A | 2/1998 | Gardner et al. |
| 5,728,321 A | 3/1998 | Abe et al. |
| 7,070,896 B2 | 7/2006 | Kishimoto et al. |
| 2004/0169163 A1 * | 9/2004 | Tsai et al. ................... 252/500 |

(Continued)

FOREIGN PATENT DOCUMENTS

JP   02-240139 A   9/1990

(Continued)

OTHER PUBLICATIONS

Tan et al., "Property Influence of Polyanilines on Photovoltaic Behaviors of Dye-Sensitized Solar Cells" Langmuir, 20, pp. 2934-2937 (2004).*

(Continued)

*Primary Examiner*—Mark Kopec
*Assistant Examiner*—Jaison P Thomas
(74) *Attorney, Agent, or Firm*—Connolly Bove Lodge & Hutz LLP

(57) ABSTRACT

A method for producing a conductive polyaniline comprising oxidative polymerizing aniline or its derivative in the presence of at least one member of a sulfonic acid compound and a water-insoluble organic polymer compound having protonic acid group in a mixed layer composed of an aqueous layer and organic layer, during which it establishes the presence of a molecular weight adjusting agent and, optionally, a phase transfer catalyst so as to stably disperse them in an organic solvent, and an organic polymer composition containing the conductive polyaniline.

2 Claims, 1 Drawing Sheet

U.S. PATENT DOCUMENTS

2006/0202169 A1    9/2006    Tseng et al.

FOREIGN PATENT DOCUMENTS

| JP | 03-028229 A | 2/1991 |
| JP | 06-279584 A1 | 10/1994 |
| JP | 07-226527 A | 8/1995 |
| JP | 10-110030 A | 4/1998 |
| JP | 2000-036330 A | 2/2000 |
| JP | 2000-173680 A | 6/2000 |
| JP | 2001-288264 A | 10/2001 |
| JP | 2003-176409 A1 | 6/2003 |
| JP | 2003-277500 A | 10/2003 |
| WO | WO-02/654848 | 8/2002 |

OTHER PUBLICATIONS

Li et al., "Novel photoelectrochromic cells containing a polyaniline layer and a dye-sensitized nanocrystalline TiO2 photovoltaic cell," Syn. Met., 94 pp. 273-277 (1998).*

Tan et al., "Influence of Small Molecules in Conducting Polyaniline on the Photovoltaic Properties of Solid-State Dye-Sensitized Solar Cells," J. Phys. Chem. B, 108, pp. 18693-18697 (2004).*

Tan et al,, "Polyaniline as a Hole Transport Material to Prepare Solid Solar Cells," Syn. Met., 137, pp. 1511-1512 (2003).*

PCT International Search Report for PCT/JP2004/015203 mailed on Dec. 14, 2004.

Tsutomu Yokozawa, et al., "Seitai kara Manabu Kagaku", Reports of Faculty of Engineering, Kanagawa University, Mar. 20, 2001, No. 39, pp. 28-36.

* cited by examiner

PHOTOVOLTAIC DEVICE COMPRISING CONDUCTIVE POLYANILINE

RELATED APPLICATIONS

This application is a divisional application of U.S. patent application Ser. No. 11/092,921 filed Mar. 30, 2005 which is a continuation-in-part application of International Application No. PCT/JP2004/015203 filed Oct. 7, 2004, designating the United States of America which claims priority to Japanese Application Nos. 2004-121943 filed Apr. 16, 2004, JP 2004-105439 filed Mar. 31, 2004 and JP 2003-349793 filed Oct. 8, 2003, disclosures of which are incorporated herein by reference.

This application is a continuation-in-part application of International Application No. PCT/JP2004/015203, designating the United States of America originally filed in Japan on Oct. 7, 2004.

BACKGROUND OF THE INVENTION

1. Field of the Invention

The present invention relates to a method for producing a conductive polyaniline and an organic polymer composition containing the same. More particularly, it relates to a method for producing a conductive polyaniline stably dispersed in an organic solvent and having a high electroconductivity and an organic polymer composition containing the same. The present invention also relates to a conductive substrate formed from a dispersion of the above conductive polyaniline having a high electroconductivity and stably dispersed in an organic solvent as well as a photovoltaic device and dye-sensitized solar cell using the same.

2. Description of the Related Art

It is known to obtain a conductive polymer including electrolyte ions as a dopant by chemical oxidative polymerization of aniline or an aniline derivative. However, conductive polyaniline is generally insoluble in an organic solvent and also is non-meltable, and therefore, is poor in processability and difficult to develop applications thereof. Further, it has been reported to obtain polyaniline and polyaniline derivatives soluble in an organic solvent by polymerization of a salt of an aniline comprising sulfonic acid such as dodecylbenzene sulfonic acid, dinonylnaphthalene sulfonic acid and aniline or its derivative (Japanese Unexamined Patent Publication (Kokai) No. 6-279584 No. 2003-176409, U.S. Pat. No. 5,232,631). However, the solubility of polyaniline or a polyaniline derivative in an organic solvent is not necessarily high. For example, the solubility of aniline dodecylbenzene sulfonate in toluene or xylene is at most 0.5%. Thus, a method for producing polyaniline having a further higher solubility is sought. Further, a conductive polymer composition composed of a substituted or unsubstituted polyaniline, a protonic acid and an organic solvent has been reported (Japanese Unexamined Patent Publication (Kokai) No. 2003-176409), but since the oxidizing agent/aniline (molar ratio) at the time of polymerization of the aniline is 0.5, there is the problem that the yield of the polyaniline is 30 to 40%. When a molar ratio of an oxidizing agent/aniline is 1.0 or more, the dispersion stability becomes insufficient. Further, attempts are being made to improve the solubility by introducing a substituent into the side chain of the aniline, but this is not for general use products, the yield is low and the conductivity is decreased, and therefore, this proposal is not preferred. The solubility and dissolution of the polyaniline or polyaniline derivative in an organic solvent referred to here indicates coexistence of the state where fine particles of polyaniline or a polyaniline derivative are dispersed in an organic solvent and the state where polyaniline or a polyaniline derivative is dissolved in an organic solvent.

A photovoltaic device is composed of a photoelectrode and a counter electrode. In the past, as the counter electrode, an electrode composed of a platinum thin film formed on a transparent conductive glass substrate by vacuum vapor deposition or sputtering has been used. However, vacuum vapor deposition or sputtering requires expensive vacuum equipment. Further, the size of the substrate is strictly restricted, so it is difficult to form a platinum layer on a substrate of a large area.

The dye-sensitized solar cell was developed by Graetzel et al. of Switzerland. Among solar cells using organic materials, it has the advantages that it is high in photovoltaic conversion efficiency and is lower in manufacturing cost compared with silicon-based solar cells and, therefore, is gaining attention as a new type of solar cell.

FIG. 1 shows an example of the typical configuration of a dye-sensitized solar cell. Typical examples of a dye-sensitized solar cell include, a ruthenium complex dye-sensitized type titanium dioxide solar cell. Explaining the configuration of a cell taking, as an example, this ruthenium complex dye-sensitized type titanium dioxide solar cell, shown in FIG. 1, a transparent substrate 11 such as glass is provided on one surface with a transparent conducting layer 12. On the top thereof, an oxide semiconductor mesoporous film 13 is formed comprising oxide semiconductor particles such as titanium dioxide and carrying a photosensitizing dye (e.g., a ruthenium complex dye) to form a photoelectrode 14. A counter electrode 15 is arranged facing the photoelectrode 14. It is possible to arrange the electrolyte layer 16 comprising an electrolyte comprising non-aqueous solution containing a redox of iodine/iodine ion, etc. between the photoelectrode 14 and counter electrode 15.

In this dye-sensitized solar cell, when sunlight or other light strikes the cell from the transparent substrate 11 side, electromotive force is generated between the photoelectrode 14 and counter electrode 15, electrons flow from the photoelectrode 14 to the counter electrode 15, and power is generated. The counter electrode 15 comprising a conductive substrate such as, metal substrate or a non-conductive substrate such as glass substrate on which a conducting layer such as platinum, gold, carbon is formed, or a non-conductive substrate such as glass substrate on which a conductive metal oxide film and a conducting layer such as platinum, gold, carbon, are formed, or on a nonconductive substrate such as a glass substrate, a conductive metal oxide film such as fluorine-doped tin oxide (FTO) and tin-doped indium oxide (ITO) and a conductive film such as platinum, gold and carbon are successively laminated. In particular, platinum has large catalytic action enabling smooth injection of electrons from the counter electrode 15 to the electrolyte 16, so a counter electrode 15 having a platinum thin film is much used.

A counter electrode 15 having a platinum thin film has conventionally been obtained forming a platinum thin film on a substrate by vacuum vapor deposition or sputtering (Japanese Unexamined Patent Publication (Kokai) No. 2000-173680 and Japanese Unexamined Patent Publication (Kokai) No. 2000-36330). However, platinum is an expensive precious metal more expensive than gold. When using sputtering or vacuum vapor deposition to form a counter electrode 15 having a platinum thin film, there is much waste in the consumption of materials, the productivity is low, a vacuum facility is required, the capital cost is high and the production cost becomes higher. Alternatively, a counter electrode 15 having a platinum thin film may be formed by a method of dipping a substrate into a platinum solution such as chloroplatinic acid solution to coat the substrate with the platinum solution, then sintering it or by coating a platinum solution on a substrate by spraying, then sintering it. Both dipping and spraying may also be mentioned as simple methods, since they do not require vacuum facilities, but to convert a platinum solution coated on a substrate to a platinum thin film, sintering at about 400° C. is required, so there was the defect that this method cannot be applied to a substrate weak against heat.

Further, a counter electrode formed with a conductive polymer thin film, instead of a platinum thin film, has also been reported (Japanese Unexamined Patent Publication (Kokai) No. 7-226527). As a method of forming a conductive polymer thin film, the method of using electrochemical polymerization to form a conductive polymer thin film on a conductive substrate or the method of coating a conductive polymer dispersion or solution on a substrate may be exemplified. Regarding the "conductive polymer solution" mentioned herein, the co-existence of the state of conductive polymer particles dispersed in a solvent and the state of a conductive polymer dissolved in a solvent is defined as a "conductive polymer solution" for brevity. Regarding the electrochemical polymerization, since the substrate which can be used is restricted to a conductive substrate or the area of the substrate which can be used is restricted, it is difficult to form a large area conductive polymer thin film on the substrate. Further, as a conductive polymer particle dispersion or conductive polymer solution, for example, an aqueous poly(3,4-ethylenedioxythiophene) dispersion (Baytron P made by Bayer), an aqueous polyaniline solution (Aquasave made by Mitsubishi Rayon), etc. may be exemplified. However, the synthesis of a monomer is troublesome. Further, as a polyaniline solution, an N-methylpyrrolidone solution of a polyaniline has been reported, but the method of preparation of the solution was troublesome or, since the polyaniline thin film obtained from a polyaniline solution is an insulator, an operation for doping to convert it to a conductor is necessary and not simple (Japanese Unexamined Patent Publication (Kokai) No. 3-28229 and U.S. Pat. No. 5,728,321). Further, an organic solvent dispersion of a conductive polyaniline has been reported in the Japanese Unexamined Patent Publication (Kokai) No. 6-279584 or Japanese Unexamined Patent Publication (Kokai) No. 2003-277500, but the dispersability to an organic solvent is not necessarily high (Japanese Unexamined Patent Publication (Kokai) No. 6-279584) or the method of preparation of the dispersion was troublesome. Further, the conductive polymer thin film formed with the conductive polymer particle dispersion or conductive polymer solution does not exhibit a performance as good as a platinum thin film.

SUMMARY OF THE INVENTION

The object of the present invention is to provide a method for producing a conductive polyaniline stably dispersed in an organic solvent at a high yield and a polymer composition containing the conductive polyaniline obtained therefrom.

Another object of the present invention is to provide a conductive substrate able to be easily obtained inexpensively at a high yield, using a dispersion of a conductive polyaniline stably dispersed in an organic solvent, and exhibiting a performance equal to or better than a counter electrode having a conventional platinum thin film.

A further object of the present invention is to provide a counter electrode capable of forming at a low production cost under a low temperature, while having a performance equal to or better than a counter electrode having a conventional platinum thin film and to provide a dye-sensitized solar cell using the same.

In accordance with the present invention, there is provided a method for producing a conductive polyaniline stably dispersed in an organic solvent comprising oxidative polymerizing aniline or its derivative in the presence of at least one member selected from the group consisting of sulfonic acids and water-insoluble organic polymers having a protonic acid group in a mixed layer composed of an aqueous layer and organic layer during which it establishes the presence of a molecular weight adjusting agent and, optionally, a phase transfer catalyst.

In accordance with the present invention, there is also provided a conductive polyaniline-containing organic polymer composition comprising a conductive polyaniline obtained by the above method and an organic polymer.

In accordance with the present invention, there is further provided a conductive substrate comprising, coated thereon, (A) polyaniline derived from polymerization of aniline or aniline derivative, (B) sulfonic acid and/or (C) an organic polymer having a protonic acid group, (D) a molecular weight adjusting agent and (E) an organic solvent capable of dissolving the sulfonic acid (B), the organic polymer having a protonic acid group (C) and the molecular weight adjusting agent (D).

In accordance with the present invention, there is still further provided a photovoltaic device comprising (i) a photoelectrode composed of a transparent conducting layer and a metal oxide semiconductor mesoporous film, (ii) a counter electrode located opposite to the photoelectrode and (iii) an electrolyte layer containing a redox couple present between the both electrodes, wherein said counter electrode is formed by the conductive substrate mentioned above.

In accordance with the present invention, there is still further provided a dye-sensitized solar cell comprising a metal oxide semiconductor mesoporous film of the counter electrode mentioned above and a photosensitizing dye carried thereon.

BEST MODE FOR CARRYING OUT THE INVENTION

Figure 1:
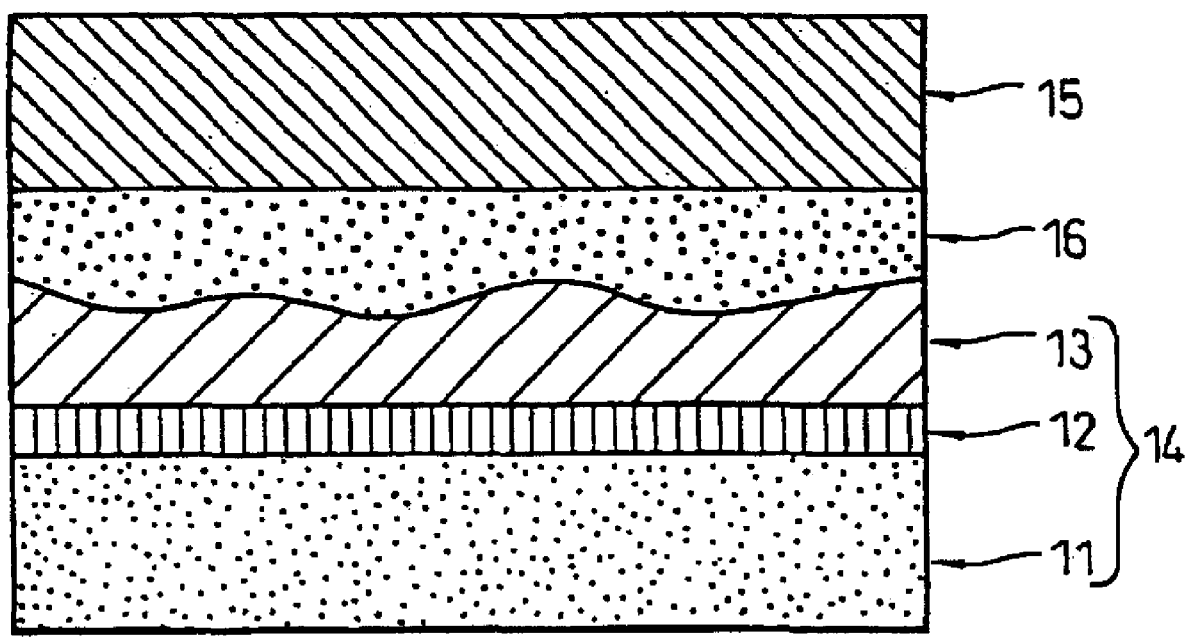
FIG. 1 is a view of an example of the basic configuration of a dye-sensitized solar cell of the present invention.

The singular form ("a", "an" and "the") used in the present specification and the attached "claims" should be understood as including the plural form, except when otherwise clear it does not from the context.

In the present invention, when producing polyaniline, it is possible to synthesize conductive polyaniline stably dispersed in an organic solvent at a high yield by establishing the presence of a molecular weight adjusting agent and, when necessary, a phase transfer catalyst in the presence of a sulfonic acid compound and/or a polymer compound having a protonic acid group. Further, when mixing the polyaniline obtained with SBR in a toluene solution, the electroconductivity of a composition containing 5 wt % of polyaniline, based upon the weight of SBR, is $10^{-5}$ $Scm^{-1}$ and a rubber composition exhibiting a sufficient static electricity removing effect is obtained.

The conductive polyaniline soluble in an organic solvent according to the present invention is normally obtained by oxidative polymerization of aniline or its derivative or any mixture thereof.

As the above aniline derivative, an aniline derivative having at least one alkyl group, alkenyl group, alkoxy group, alkylthio group, aryl group, aryloxy group, alkylaryl group, arylalkyl group and alkoxyalkyl group, as a substituent, at a position other than the 4th position may be mentioned. Preferably, an aniline derivative having at least one $C_1$ to $C_5$ alkyl group, alkoxy group, alkoxyalkyl group, preferably a $C_6$ to $C_{10}$ aryl group, as a substituent, may be mentioned.

The oxidizing agent for the above oxidative polymerization is not particularly limited so long as it can polymerize the above aniline or its derivative. For example, ammonium persulfate, persulfuric acid, sodium persulfate, potassium persulfate and other persulfates, hydrogen peroxide, ferric chloride, ferric sulfate, potassium bichromate, potassium permanganate, hydrogen peroxide-ferrous salt and other redox initiators, etc. may be preferably used. These oxidizing agents may be used alone or in any combination of two or more types. The amount of the oxidizing agent usable in the present invention is not particularly limited so long as it is an amount capable of oxidatively polymerizing the above aniline or its derivative, but is preferably 0.01 to 10 moles, more preferably 0.1 to 5 moles, based upon 1 mole of aniline or its derivative.

The present invention oxidatively polymerizes the aniline or its derivative in the presence of a molecular weight adjusting agent and, when necessary, a phase transfer catalyst in the presence of a sulfonic acid compound and/or an organic polymer compound having a protonic acid group. The polymerization is carried out in a mixed layer of an aqueous layer and an organic layer.

As the sulfonic acid usable in the present invention, it is possible to use any sulfonic acid used for oxidative polymerization of aniline in the past, specifically an aliphatic or aromatic sulfonic acid having one or more sulfonic acid groups and their salts such as an alkylsulfonic acid, arylsulfonic acid, alkylarylsulfonic acid, α-olefin sulfonic acid, a sulfonic acid of a higher fatty acid ester, (di)alkylsulfosuccinic acid, a sulfonic acid of a higher fatty acid amide, camphorsulfonic acid and salts thereof. The amount of use of these sulfonic acids is not particularly limited, but use of 0.01 to 5 moles based upon 1 mole of aniline or its derivative is preferable and use of 0.1 to 3 moles is more preferable. At the time of polymerization, in addition to the sulfonic acid, it is also possible to add hydrochloric acid, sulfuric acid, nitric acid, perchloric acid or another inorganic acid, m-nitrobenzoic acid, trichloroacetic acid or another organic acid or another protonic acid, if necessary.

The water-insoluble organic polymer compound having a protonic acid group usable in the present invention has a structure where a plurality of side chains having protonic acid groups and a plurality of side chains exhibiting affinity with an organic solvent are bonded to the main chain. The protonic acid groups are not limited to the side chain ends and a plurality thereof may also be present in the middle of the side chains. As the protonic acid group, a sulfonic acid group, a carboxyl group, a phosphoric acid group or a sulfuric acid group may be mentioned. Preferably, there is a sulfonic acid group, carboxyl group or phosphoric acid group. The water-insoluble polymer compound having a protonic acid group is not particularly limited so long as it satisfies the above structure, but a copolymer of an ethylenic unsaturated monomer having a protonic acid group and an ethylenic unsaturated monomer having a side chain exhibiting affinity with an organic solvent may be mentioned. As an ethylenic unsaturated monomer having a protonic acid group, styrenesulfonic acid, vinylsulfonic acid, allylsulfonic acid, methalyl sulfonic acid, 2-methacryloyloxyethyl-1-sulfonic acid, 3-methacryloyloxypropane-1-methyl-1-sulfonic acid, 3-methacryloyloxypropane-1-sulfonic acid, 4-methacryloyloxybutane-1-sulfonic acid, 2-acrylamido-2-methylpropane sulfonic acid, methalyloxybenzene sulfonic acid, methalyl sulfonic acid, acrylic acid, methacrylic acid, itaconic acid, maleic acid, fumaric acid, crotonic acid, monobutyl fumarate, monobutyl maleate, monoethylhexyl maleate, hydroxypropyl maleate, maleate anhydride, citraconic acid anhydride, ethyl(meth)acrylate phosphate, polyoxyethyleneglycol mono(meth)acrylate phosphate, or propyleneglycol mono(meth)acrylate phosphate may be mentioned. Further, the protonic acid group of the ethylenic unsaturated monomer having these protonic acid groups may also be an ammonium group, alkali metal salt or salt of an organic amine group. As the ethylenic unsaturated monomer having a side chain exhibiting affinity with the organic solvent, styrene, α-methylstyrene, chlorostyrene, 1,3-butadiene, isoprene, 2,3-dimethyl-1,3-butadiene, 1,3-pentadiene, vinyl chloride, vinylidene chloride, (meth)acrylonitrile, a styrene derivative having a $C_1$ to $C_{30}$, hetero atom-includable hydrocarbon group, a (meth)acrylic acid ester derivative, a (meth)acrylamide derivative, a vinyl ether derivative, or a carboxylic acid vinyl ester derivative may be mentioned. The above copolymer may be any of a random copolymer, block copolymer or graft copolymer. The above polymer may be obtained by using a known polymerization method.

As the water-insoluble organic polymer compound having a protonic acid group, it is possible to use a commercially available water-insoluble pigment dispersant. As such commercially available products, for example, Disperbyk 110, Disperbyk 111, Disperbyk 171, Disperbyk 174, BYK-P104 (made by BYK Chemie), Solsperse 26000, Solsperse 32000 (made by Avesia), etc. may be mentioned. The amount of the organic polymer compound having these protonic acid groups used is not particularly limited, but preferably an organic polymer compound is used so that the protonic acid group becomes a ratio of 0.05 to 20 moles with respect to one mole of the aniline or the derivative, more preferably 0.1 to 10 moles is used.

As the molecular weight adjusting agent used in the present invention, an aniline derivative having a substituent at the 4th position, a thiol compound, a disulfide compound and/or an α-methylstyrene dimer may be mentioned.

As the aniline derivative having a substituent X at the 4th position, a compound of formula (I) may be mentioned:

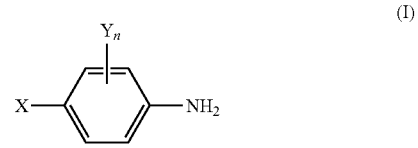

(I)

In formula (I), X indicates an alkyl group, alkenyl group, alkoxy group, alkylthio group, aryl group, aryloxy group, alkylaryl group, arylalkyl group, alkoxyalkyl group, or halogen group, Y indicates a hydrogen atom, alkyl group, alkenyl group, alkoxy group, alkylthio group, aryl group, aryloxy group, alkylaryl group, arylalkyl group, alkoxyalkyl group, or halogen group, and n indicates an integer of 0 to 4, where when n is an integer of 2 to 4, Y may be the same or different. A preferable substituent X is a $C_1$ to $C_5$ alkyl group, alkoxy group, alkoxyalkyl group, or $C_6$ to $C_{10}$ aryl group. A preferable substituent Y is a hydrogen atom, a $C_1$ to $C_5$ alkyl group, alkoxy group, alkoxyalkyl group, or $C_6$ to $C_{10}$ aryl group.

As the thiol compound and/or disulfide compound used in the present invention, butyl mercaptan, octyl mercaptan, dodecyl mercaptan, hexadecyl mercaptan, tetradecyl mercaptan, 2,2,4,6,6-pentamethylheptane-4-methylenethiol, and other thiol compounds, diethyl disulfide, dibutyl disulfide, and other alkyl disulfides, diphenyl disulfide, dibenzyl disulfide, and other aromatic disulfides, dimethyl xanthogen disulfide, diethyl xanthogen disulfide, and other xanthogen disulfides, tetramethyl thiuram disulfide, tetraethyl thiuram disulfide, and other thiuram disulfides and other disulfide compounds may be mentioned. These are known compounds and most are generally commercially available. The amount of the molecular weight adjuster used is not particularly limited, but use of $5.0 \times 10^{-5}$ to $5.0 \times 10^{-1}$ moles per 1 mole of the aniline or its derivative is preferable, while the use of $2.0 \times 10^{-4}$ to $2.0 \times 10^{-1}$ moles is more preferable.

The phase transfer catalyst usable in the preferable embodiment of the present invention is not particularly limited so long as it is generally used as a phase transfer catalyst, but specifically benzyltriethylammonium chloride, methyltrioctylammonium chloride, tetra-n-butylammonium bromide, tetra-n-butylammonium iodide, tetra-n-butylammonium chloride, and other tetraalkylammonium halides; tetrabutylammonium hydroxide and other tetraalkylammonium hydroxides; methyltriphenylphosphonium bromide and other tetraalkylphosphonium halides; 12-crown-4,15-crown-5,18-crown-6 and other crown ethers etc. may be mentioned. Among these, tetraalkylammonium halides are preferable in terms of ease of handling such as removal of the catalyst after the reaction. In particular, the industrially inexpensively available tetra-n-butylammonium bromide or tetra-n-butylammonium chloride is preferable. In the present invention, the amount of the phase transfer catalyst used, when necessary, is not particularly limited, but is preferably at least 0.0001 molar times of the oxidizing agent, more preferably at least 0.005 molar times, but if the phase transfer catalyst is used in excess, the isolation and refining processes after the end of the reaction become difficult, and therefore, when used, it is preferably used in a range of 5 molar times or less, more preferably equal molar times or less.

Regarding the method of oxidative polymerization of the aniline or its derivative according to the present invention, other than making use of the above reaction ingredients as essential requirements, it is possible to employ methods as used in the past. Other conventional additives may also be used as in the past in so far as they do not detract from the object of the present invention. The polymerization medium of the present invention uses two types of liquid media, that is, water and an organic solvent, as solvents. The organic solvent is not particularly limited so long as it dissolves aniline or its derivative and is not water-soluble. As specific examples, benzene, toluene, xylene, or other aromatic hydrocarbons; hexane, heptane, octane, or other aliphatic hydrocarbons; dichloroethane, chloroform, 1,2-dichloroethane, chlorobenzene, dichlorobenzene, and other halogenated hydrocarbons; diethyl ether, di-n-propyl ether, diisopropyl ether, di-n-butyl ether, tert-butylmethyl ether, and other ethers; ethyl acetate, n-propyl acetate, isopropyl acetate, n-butyl acetate, and other esters may be mentioned. Among these, aromatic hydrocarbons, aliphatic hydrocarbons, and halogenated hydrocarbons are preferable, while the inexpensive and low toxicity toluene and xylene are particularly preferable. The above organic solvents may be used in combinations of two or more types mixed together. As the amount of the liquid medium used, any stirrable amount is possible. Normally, 1 to 500 times by weight of the aniline or its derivative, preferably 2 to 300 times by weight is used. Here, the amount of the organic solvent used is 0.05 to 30 times by weight of the water, preferably 0.1 to 10 times by weight of water.

The reaction temperature is not particularly limited, but preferably is −10° C. to 80° C. The polyaniline oxidative polymerized according to the present invention is extremely high in yield, normally 80% or more. Further, the electroconductivity is $10^{-9}$ Scm$^{-1}$ or more.

The polyaniline stably dispersed in an organic solvent of the present invention may be isolated by the following procedures:

(a) The method of isolating aniline by removing the organic solvent from the reaction solution obtained by evaporation etc. to cause the polyaniline to precipitate, then removing the water.

(b) The method of isolating polyaniline dispersed in an organic solvent by adding water and/or a polar organic solvent to the reaction solution obtained and removing only the water from the reaction solution separated into the organic layer and aqueous layer.

(c) The method of isolating polyaniline by adding an excess of a polar organic solvent to the reaction solution obtained to cause polyaniline to precipitate, then using filtration or decantation etc. to remove the solvent.

Among these, the preferable methods of isolation are the methods of (a) and (b). The more preferable one is the method of (b).

Further, a polyaniline dispersion may also be prepared by the following procedures in addition to the above method (b).

(d) The method of dispersing the polyaniline isolated by (a) or (c) in the organic solvent used when oxidative polymerizing aniline or an aniline derivative.

(e) The method of adding the organic solvent used when preparing the dispersion and/or an organic solvent soluble with this organic solvent to the polyaniline dispersion prepared by the method of (b).

When preparing the above polyaniline dispersion, a sand mills beads mill, ball mill, triple roll mill, colloid mill, ultrasonic homogenizer, Henschel mixer, jet mill or other disperser may also be used.

The organic polymer composition according to the present invention is obtained by preferably blending 0.01 to 100 parts by weight of a conductive polyaniline, more preferably 0.05 to 80 parts by weight, based upon 100 parts by weight of an organic polymer composition. If the amount blended is too small, the conductivity of the organic polymer composition is liable to become $10^{-12}$ Scm$^{-1}$ or less. Conversely, if too large, an effect commensurate with the amount added may not be able to be obtained.

The organic polymer usable in the organic polymer composition of the present invention is not particularly limited, but as preferable examples, natural rubber, isoprene rubber, nitrile rubber (e.g., acrylonitrile-butadiene rubber, acrylonitrile-styrene-butadiene rubber, etc.), hydrogenated nitrile rubber, butadiene rubber, styrene-butadiene rubber, butyl rubber, halogenated butyl rubber, ethylene-α-olefin rubber (e.g., ethylene-propylene rubber, ethylene-propylene-nonconjugated diene rubber, ethylene-butene-nonconjugated diene rubber, etc.), polynorbornene rubber, acryl rubber, fluororubber, silicone rubber, ethylene-vinyl acetate rubber, epichlorohydrin rubber, epichlorohydrin-ethylene oxide copolymer rubber, chlorinated polyethylene rubber, chloroprene rubber, chlorosulfonated polyethylene rubber, fluororubber, polyurethane rubber or other rubber, polyethylene, polypropylene or other polyolefin resin, polyethylene terephthalate, polyethylene naphthalate, polybutylene terephthalate or other polyester resin, nylon 6 or nylon 6,6 or other polyamide resin, bisphenol A-type epoxy resin, novolac type epoxy resin or other epoxy resin, polyamide imide, polyamic acid or other polyimide resin, polyfluorovinylidene or other fluororesin, modified PPE resin, polycarbonate resin, polyacetal resin or modified products thereof or other resins etc. may be mentioned.

The method for mixing the organic polymer and conductive polyaniline is not particularly limited. For example, the method for mixing polyaniline isolated by the above procedures (a) and (c) and an organic polymer by a kneader may be mentioned. As a kneader, a roll, kneader, Bambury mixer, twin-screw extruder, etc. may be mentioned. Further, it may be obtained by mixing the polyaniline dispersion isolated by the above procedure (b), (d) and (e) and the organic polymer. The organic polymer mixed may be dissolved or dispersed in a solvent in advance. The solvent is not particularly limited, but a solvent having solubility with the solvent used when preparing the polyaniline dispersion is preferable. The mixing method is not particularly limited so long as the polyaniline and organic polymer can be efficiently mixed, but the simple agitation and mixing method and the method for mixing using a sand mill, beads mill, ball mill, triple roll mill, colloid mill, ultrasonic homogenizer, Henschel mixer, jet mill, or other disperser may also be mentioned. When mixing a solid organic polymer and polyaniline dispersion, it is also possible to use the above kneader. Further, the organic polymer composition of the present invention may also be obtained by mixing with the above organic polymer the polyaniline and/or polyaniline dispersion obtained by the above technique and a plasticizer and process oil generally used for improving the processability and flexibility of organic polymers mixed in advance. Further, the organic polymer composition may also be obtained by mixing with the above organic polymer the polyaniline and/or polyaniline dispersion obtained by the above technique and carbon black, silica, talc or other filler used as a filler for the above organic polymer mixed in advance. Further, the organic polymer composition of the present invention may also be obtained by mixing with the above organic polymer the polyaniline and/or polyaniline dispersion obtained by the above technique treating the above filler on its surface.

The organic polymer composition according to the present invention may include as other ingredients, for example, carbon black, silica, talc or another filler, a vulcanization or cross-linking agent, a vulcanization or cross-linking accelerator, a silane coupling agent, various types of oils, an antioxidant, a UV absorbent, an optical stabilizer, a flame retardant, a plasticizer, or other various types of additives generally blended into rubber or resins in the conventional blended amounts. The organic polymer composition according to the present invention may also include, as other ingredients, an ion conducting agent, an electron conducting agent, etc. As an ion conducting agent, for example, a quaternary ammonium salt, a borate, a surfactant, etc. may be mentioned. As an electron conducting agent, conductive zinc oxide, conductive titanium oxide, conductive stannous oxide, graphite, etc. may be mentioned.

According to a further aspect of the present invention, the conductive substrate having a performance equal to or better than a counter electrode having a conventional platinum thin film can be obtained by the use of the above conductive polyaniline dispersion stably dispersed in an organic solvent and capable of producing at a high yield and at a low cost.

The inventors previously made it possible, when producing a polyaniline (A) from an aniline or aniline derivative, to synthesize a conductive polyaniline able to be stably dispersed in an organic solvent by oxidative polymerization together with a molecular weight adjusting agent (D) in the presence of an organic sulfonic acid (B) and/or high molecular weight polymer having a protonic acid group (C). The inventors engaged in further research and succeeded in coating this polyaniline dispersion on a transparent conductive glass substrate comprised of an FTO glass (glass formed on one surface with a fluorine-doped tin oxide transparent conducting layer) substrate, drying it, and thereby laying a polyaniline (PAn) conducting layer on an FTO glass substrate to fabricate an FTO-PAn electrode. The inventors found that a dye-sensitized solar cell having this FTO-PAn electrode as a counter electrode, compared with a cell using only FTO glass as a counter electrode, becomes larger in short-circuit photocurrent and open-circuit photovoltage and higher in energy conversion efficiency.

The polyaniline (A) forming the conductive polyaniline dispersion according to the present invention can be obtained by oxidative polymerization of an aniline or its derivative or any mixture thereof, as mentioned above. The other components are also available, as mentioned above.

According to the present invention, a dispersion of an organic solvent (E) including the components (A), (B) and/or (C) and (D) may be coated on a conductive substrate by an ordinary method, for example, a known wet type film formation method, so as to form a conductive polyaniline thin film on a substrate having a transparent conducting layer. The wet type film formation method is not particularly limited. For example, screen printing, injection printing, roll coating, doctor blade coating, spin coating, spray coating, etc. may be mentioned. It is possible to use this method to coat the dispersion to a thickness of, for example, 0.01 to 100 µm to obtain a conductive substrate according to the present invention. The concentrations of the ingredients in the dispersion are not particularly limited, but from the viewpoints of the dispersion stability of the polyaniline dispersion and the conductivity and strength of the polyaniline thin film formed from the dispersion, 0.01 to 90 wt % of the polyaniline (A), 0 to 80 wt % of the sulfonic acid (B), 0 to 80 wt % of the organic polymer having a protonic acid group (C), and 0.01 to 20 wt % of the molecular weight adjusting agent (D) are preferable.

As the conductive substrate to be coated with the polyaniline dispersion of the present invention, as in the past, for example, a metal, a glass or resin substrate having a conducting layer on the surface, etc. may be used. As the metal, except for platinum, a metal such as gold, silver, copper, aluminum, indium, titanium may be used. Examples of the resin substrate are polymethylmethacrylate, polycarbonate, polystyrene, polyethylene sulfide, polyether sulfone, polyolefin, polyethylene terephthalate, polyethylene naphthalate, polyarylate, polyimide, triacetyl cellulose, etc. As the conducting layer provided on the surface, except for platinum, gold, silver, copper, aluminum, indium, titanium and other metal, ruthenium oxide, antimony- or fluorine-doped tin oxide, aluminum- or potassium-doped zinc oxide, tin-doped indium oxide, or other conductive metal oxide, carbon, etc. may be mentioned. The thickness of the conducting layer is preferably 0.01 to 10 µm or so. The method of provision of the conducting layer may be a conventional method. For example, coating, sputtering, vacuum vapor deposition, spray pyrolysis, chemical vapor deposition (CVD), sol gel, etc. may be mentioned.

The conductive substrate of the present invention is obtained by coating the above-mentioned conductive substrate with a polyaniline dispersion, but it is also possible to coat a non-conductive substrate comprised of a glass or resin substrate directly with a polyaniline dispersion and use it as a conductive substrate.

The conductive substrate according to the present invention may be used for a photovoltaic device or dye-sensitized solar cell instead of a counter electrode having a conventional platinum thin film.

A photovoltaic device and dye-sensitized solar cell shown in FIG. 1 will now be explained.

The photoelectrode 14 is composed of a transparent substrate 11, a transparent conducting layer 12 and an oxide semiconductor mesoporous film 13. The transparent substrate 11 may be a glass substrate or a resin substrate such as polystyrene, polyethylene, polypropylene, polyethylene terephthalate, polyethylene naphthalate, polycarbonate, polyphenylenesulfide, cyclic olefin polymer, polyether sulfone, polyallylate, triacetyl cellulose. One having a good light transmission property is good.

As the transparent conducting layer 12, a conductive metal oxide such as antimony- or fluorine-doped tin oxide, aluminum- or gallium-doped zinc oxide, tin-doped indium oxide may be mentioned. The thickness of the conducting layer is preferably 0.01 to 10 μm or so. The method for providing the conducting layer may be a conventional method. For example, coating, sputtering, vacuum vapor deposition, spray pyrolysis, chemical vapor deposition (CVD), sol gel, etc. may be mentioned.

The oxide semiconductor mesoporous film 13 can be obtained by coating a dispersion of oxide semiconductor particles on a transparent conducting layer 12. As the oxide semiconductor particles, titanium oxide, tin oxide, zinc oxide, tungsten oxide, zirconium oxide, hafnium oxide, strontium oxide, vanadium oxide, niobium oxide, etc. may be mentioned. These may be used alone or in any combination thereof. The dispersion of the oxide semiconductor particles can be obtained by mixing the semiconductor particles and the dispersion medium by a dispersion mixer such as sand mill, beads mill, ball mill, triple roll mill, colloid mill, ultrasonic homogenizer, Henschel mixer, jet mill. Further, to prevent reagglomeration of particles in the dispersion, acetyl acetone, hydrochloric acid, nitric acid, a surfactant, a chelating agent, etc. may also be added. Further, for the purpose of thickening the dispersion, a polymer such as polyethylene oxide or polyvinyl alcohol, a cellulose-based thickening agent and various other types of thickening agents may be added.

As a semiconductor particle dispersion, a commercially available product (titanium dioxide paste SP100, SP200 made by Showa Denko, Ti-Nanoxide-T, Ti-Nanoxide-D made by Solaronix, PECC01 made by Peccell Technologies) may be used. As the method for coating the dispersion of the semiconductor particles on the transparent conducting layer, for example a known wet type film formation method may be used. The wet type film formation method is not particularly limited. For example, dipping, spin coating, casting, die coating, roll coating, doctor blade coating, bar coating, etc. may be mentioned.

Further, it is preferable to coat the dispersion of the oxide semiconductor particles on a transparent conducting layer, then perform heat treatment, chemical treatment, or plasma or ozone treatment for the purpose of improving the electronic contact between particles, improving the bondability with the transparent conducting layer and improving the film strength. The temperature of the heat treatment is preferably 40° C. to 700° C., more preferably 40° C. to 650° C. Further, the treatment time is not particularly limited, but usually is 10 seconds to 24 hours. As the chemical treatment, chemical plating using an aqueous titanium tetrachloride solution, chemical plating using a carboxylic acid derivative, electrochemical plating using an aqueous titanium trichloride solution, etc. may be mentioned.

Further, the photovoltaic device comprising a photosensidizing dye carried on the oxide semiconductor mesoporous film 13 is a dye-sensitized solar cell. The photosensidizing dye is not particularly limited so long as it is a dye which has absorption in the visible light region and/or infrared light region. A metal complex, organic dye, etc. may be used. Specifically, a ruthenium complex dye with a ligand such as a bipyridine structure or a terpyridine structure, a porphyrin-based dye, a phthalocyanine-based dye, a cyanine-based dye, a merocyanine-based dye, a xanthene-based dye, etc. may be used. The carrying method is not particularly limited, but the dye may be carried by, for example, dissolving it in water or alcohol and dipping the mesoporous film 13 in the dye solution or coating the dye solution on the mesoporous film. As a ruthenium complex dye, a commercially available product (Ruthenium 535, Ruthenium 535 bis-TBA made by Solaronix, PECD03, PECD07 made by Peccell Technologies) may be used.

As the electrolyte for forming an electrolyte layer 16, an organic solvent and/or inonic liquid containing a redox couple. As the organic solvent, acetonitrile, methoxyacetonitrile, propionitrile, ethylene carbonate, propylene carbonate, γ-butyralactone are exemplified. As the ionic liquid, imidazolium salts, pyridinium salts, pyrrolidinium salts may be exemplified (see Hiroyuki Ohno, "Kogyo Zairyo (in Japanese)" 48, 39 (2000), "Ionic Liquid—Updated Condition and Future of Development" edited by Hiroyuki Ohno, CMC publisher (2003), etc). Preferable examples are imidazolium cation and iodide ion or bistrifluoromethyl sulfonylimide anion.

The redox couple included in the electrolyte is not specifically limited. Examples are iodine/iodide ion, bromine/bromide ion. For example, iodine and a metal iodide such as LiI, NaI, KI, iodine and iodide of quaternary imidazolium compound, iodide of quaternary pyrridinium compound, iodide of tetraalkyl ammonium compound and other iodine/iodide ion pairs as well as bromine and metal bromide such as LiBr, NaBr, KBr, bromine and a bromide of quaternary imidazolium compound, a bromide of quaternary pyrridinium compound, bromide of tetraalkyl ammonium compound and other bromine/bromide ion pairs, metal complexes such as ferrocyanic acid salt-ferricyanic acid salt, ferrocene-ferricinium salt, a sulfur compound such as disulfide compound and mercapto compound, hydroquinone and quinone, etc. The redox couple of iodine and iodide ion is preferable. These redox couples may be used alone or in any combination thereof.

In addition, inorganic or organic salts may be added for the purpose of improving a short-circuit photocurrent of the photovoltic device. The preferable inorganic or organic salts include, for example, alkali metal salts and alkaline earth metal salts. Examples of such inorganic salts are lithium iodide, sodium iodide, potassium iodide, magnesium iodide, calcium iodide, lithium trifluoroacetate, sodium trifluoroacetate, lithium thiocyanate, lithium tetrafluoroborate, lithium hexafluorophosphate, lithium perchlorate, lithium trifluoromethanesulfonate, lithium bis(trifluoromethane sulfonyl) imide. These salts may be used alone or in any combination thereof. Further, for the purpose of improving an open-circuit photovoltage of the photovoltic device, pyridines, benzimidazoles, etc. may be added. Typical examples are alkylpyridines such as methylpyridine, ethylpyridine, propylpyridine, butylpyridine, etc., alkylimidazoles such as methylimidazole, ethylimidazole, propylimidazole, etc. These may be used alone or in any combination thereof.

The amounts to be added of the above salts, pyridines, benzimidazoles, etc. are not specifically limited, unless the objects of the present invention are adversely affected.

The electrolyte may be gelled with the addition of a gelling agent thereto.

Furthermore, solid positive hole transportation material such as p-type semiconductor may be used, instead of the electrolyte, for the electrolyte layer 16. As the p-type semiconductor, copper (I) compounds such as copper (I) iodide, copper (I) thiocyanide are exemplified.

EXAMPLES

The present invention will now be explained in further detail by Examples, but the present invention is not limited to these Examples.

Examples of Preparation

Preparation of Polyaniline 1 (Conductive Polyaniline Dispersion)

In 100 g of toluene, as shown in Table I, 2 g of aniline, 4.2 g of dodecylbenzene sulfonic acid, 1.0 g of polyacrylic acid derivative (Solsperse 26000, made by Avecia), and 0.03 g of 4-methylaniline were dissolved, then 50 g of distilled water in which 3.58 ml of 6N hydrochloric acid was dissolved was added. 180 mg of tetrabutylammonium bromide was added to the mixed solution, the result was cooled to 5° C. or less, then 30 g of distilled water in which 5.4 g of ammonium persulfate was dissolved was added. The resultant mixture was oxidative polymerized in the state of 5° C. or less for 5 hours, then the toluene was distilled off in vacuo. The polyaniline precipitate formed in the water was obtained by filtration, then was rinsed with water to obtain the intended Polyaniline 1. The polyaniline obtained was dispersed in 150 g of toluene, then the aqueous layer was removed to thereby obtain a polyaniline toluene dispersion. Part of the polyaniline toluene dispersion was taken and the toluene distilled off in vacuo, whereupon the dispersion contained 4.1 wt % solid (polyaniline content 1.3 wt %). This dispersion was filtered by a filter having a pore size of 1.0 µm, whereupon there was no clogging. The dispersion was stable and did not coagulate or precipitate, even after the elapse of six months at room temperature. From the elemental analysis, the molar ratio per aniline monomer unit of dodecylbenzene sulfonic acid was 0.45 and the yield of the polyaniline was 97%. Further, the electroconductivity determined by distilling off the toluene in vacuo from the dispersion, preparing pellets by a compression molding machine and measuring by the four-probe method at room temperature was 0.25 Scm$^{-1}$.

Preparation of Polyaniline 2

In 100 g of toluene, as shown in Table I, 2 g of aniline, 4.2 g of dodecylbenzene sulfonic acid, 1.0 g of polyacrylic acid derivative (Solsperse 26000, made by Avecia), and 0.03 g of 4-methylaniline were dissolved, then 50 g of distilled water in which 3.58 ml of 6N hydrochloric acid was dissolved was added. 180 mg of tetrabutylammonium bromide was added to the mixed solution, the result was cooled to 5° C. or less, then 30 g of distilled water in which 5.4 g of ammonium persulfate was dissolved was added. The resultant mixture was oxidative polymerized in the state of 5° C. or less for 5 hours, then the 50 g of toluene and then a methanol-water mixed solvent (water/methanol=2/3 (weight ratio)) were added and the resultant mixture was stirred. After the end of stirring, only the aqueous layer was removed from the reaction solution separated into the organic (toluene) layer and aqueous layer, whereby a polyaniline toluene dispersion was obtained. Part of the polyaniline toluene dispersion was taken and the toluene distilled off in vacuo, whereupon the dispersion contained 4.1 wt % solid (polyaniline content 1.3 wt %). This dispersion was filtered by a filter having a pore size of 1.0 µm, whereupon there was no clogging. The dispersion was stable and did not coagulate or precipitate, even after the elapse of six months at room temperature. From the elemental analysis, the molar ratio per aniline monomer unit of dodecylbenzene sulfonic acid was 0.45 and the yield of the polyaniline was 96%. Further, the electroconductivity determined by distilling off the toluene in vacuo from the dispersion, preparing pellets by a compression molding machine, and measuring by the four-probe method at room temperature was 0.26 Scm$^{-1}$.

Preparation of Polyaniline 3

Except for using, as the molecular weight adjusting agent, 0.05 g of dodecane thiol, instead of 4-methylaniline, the same procedure was followed as the preparation of Polyaniline 2 to obtain a polyaniline toluene dispersion. Part of the polyaniline toluene dispersion was taken and the toluene distilled off in vacuo, whereupon the dispersion contained 4.1 wt % solid (polyaniline content 1.3 wt %). This dispersion was filtered by a filter having a pore size of 1.0 µm, whereupon there was no clogging. The dispersion was stable and did not coagulate or precipitate, even after the elapse of six months at room temperature. From the elemental analysis, the molar ratio per aniline monomer unit of dodecylbenzene sulfonic acid was 0.45 and the yield of the polyaniline was 95%. Further, the electroconductivity determined by distilling off the toluene in vacuo from the dispersion, preparing pellets by a compression molding machine, and measuring by the four-probe method at room temperature was 0.25 Scm$^{-1}$.

Preparation of Polyaniline 4

Except for using, as the molecular weight adjusting agent, 0.05 g of α-methylstyrene dimer, instead of 4-methylaniline, the same procedure was followed as the preparation of Polyaniline 2 to obtain a polyaniline toluene dispersion. Part of the polyaniline toluene dispersion was taken and the toluene distilled off in vacuo, whereupon the dispersion contained 4.1 wt % solid (aniline content 1.3 wt %). This dispersion was filtered by a filter having a pore size of 1.0 µm, whereupon there was no clogging. The dispersion was stable and did not coagulate or precipitate, even after the elapse of six months at room temperature. From the elemental analysis, the molar ratio per aniline monomer unit of dodecylbenzene sulfonic acid was 0.45 and the yield of the polyaniline was 96%. Further, the electroconductivity determined by distilling off the toluene in vacuo from the dispersion, preparing pellets by a compression molding machine, and measuring by the four-probe method at room temperature was 0.25 Scm$^{-1}$.

Preparation of Polyaniline 5

Without using a polyacrylic acid derivative, the same procedure was followed as the preparation of Polyaniline 2 to obtain a polyaniline toluene dispersion. Part of the polyaniline toluene dispersion was taken and the toluene distilled off in vacuo, whereupon the dispersion contained 3.4 wt % solid (polyaniline content 1.3 wt %). This dispersion was filtered by a filter having a pore size of 1.0 µm, whereupon there was no clogging. The dispersion was stable and did not coagulate or precipitate, even after the elapse of six months at room temperature. From the elemental analysis, the molar ratio per aniline monomer unit of dodecylbenzene sulfonic acid was 0.45 and the yield of the polyaniline was 96%.

Further, the electroconductivity determined by distilling off the toluene in vacuo from the dispersion, preparing pellets by a compression molding machine, and measuring by the four-probe method at room temperature was 0.25 Scm$^{-1}$.

Preparation of Polyaniline 6

Without using dedecylbenzene sulfonic acid, the same procedure was followed as the preparation of Polyaniline 2 to obtain a polyaniline toluene dispersion. Part of the polyaniline toluene dispersion was taken and the toluene distilled off in vacuo, whereupon the dispersion contained 2.0 wt % solid (polyaniline content 1.3 wt %). This dispersion was filtered by a filter having a pore size of 1.0 μm, whereupon there was no clogging. The dispersion was stable and did not coagulate or precipitate, even after the elapse of three months; at room temperature. The yield of the polyaniline was 96%. Further, the electroconductivity determined by distilling off the toluene in vacuo from the dispersion, preparing pellets by a compression molding machine, and measuring by the four-probe method at room temperature was 0.21 Scm$^{-1}$.

Preparation of Polyaniline 7

Without using tetrabutylammonium bromide, the same procedure was followed as the preparation of Polyaniline 2 to obtain a polyaniline toluene dispersion. Part of the polyaniline toluene dispersion was taken and the toluene distilled off in vacuo, whereupon the dispersion contained 2.7 wt % solid (polyaniline content 0.8 wt %). This dispersion was filtered by a filter having a pore size of 1.0 μm, whereupon there was no clogging. The dispersion was stable and did not coagulate or precipitate even after the elapse of six months at room temperature. From the elemental analysis, the molar ratio per aniline monomer unit of dodecylbenzene sulfonic acid was 0.45 and the yield of the polyaniline was 60%. Further, the electroconductivity determined by distilling off the toluene in vacuo from the dispersion, preparing pellets by a compression molding machine, and measuring by the four-probe method at room temperature was 0.25 Scm$^{-1}$.

Preparation of Polyaniline 8

Without using 4-methylaniline or tetrabutylammonium bromide, the same procedure was followed as the preparation of Polyaniline 2 to obtain a polyaniline toluene dispersion. Part of the polyaniline toluene dispersion was taken and the toluene distilled off in vacuo, whereupon the dispersion contained 2.7 wt % solid (polyaniline content 0.7 wt %). This dispersion was filtered by a filter with a pore size of 1.0 μm, whereupon there was no clogging. The dispersion was allowed to stand at room temperature for six months, whereupon a precipitate of the polyaniline was formed. From the elemental analysis, the molar ratio per aniline monomer unit of dodecylbenzene sulfonic acid was 0.45 and the yield of the polyaniline was 55%. Further, the electroconductivity determined by distilling off the toluene in vacuo from the dispersion, preparing pellets by a compression molding machine, and measuring by the four-probe method at room temperature was 0.20 Scm$^{-1}$.

TABLE I

| | Poly-aniline 1 | Poly-aniline 2 | Poly-aniline 3 | Poly-aniline 4 | Poly-aniline 5 | Poly-aniline 6 | Poly-aniline 7 | Poly-aniline 8 |
|---|---|---|---|---|---|---|---|---|
| Aniline | 2.0 | 2.0 | 2.0 | 2.0 | 2.0 | 2.0 | 2.0 | 2.0 |
| Dodecylbenzene sulfonic acid | 4.2 | 4.2 | 4.2 | 4.2 | 4.2 | — | 4.2 | 4.2 |
| Polyacrylic acid derivative | 1.0 | 1.0 | 1.0 | 1.0 | — | 1.0 | 1.0 | 1.0 |
| 4-methylaniline*1 | 0.03 | 0.03 | — | — | 0.03 | 0.03 | 0.03 | — |
| Dodecane thiol*1 | — | — | 0.05 | — | — | — | — | — |
| α-methylstyrene dimer*1 | — | — | — | 0.05 | — | — | — | — |
| Tetrabutylammonium bromide*2 | 0.18 | 0.18 | 0.18 | 0.18 | 0.18 | 0.18 | — | — |
| Yield (%) | 97 | 96 | 95 | 96 | 96 | 96 | 60 | 55 |
| Dispersibility (wt %)*3 | 4.1 (1.3) | 4.1 (1.3) | 4.1 (1.3) | 4.1 (1.3) | 3.4 (1.3) | 2.0 (1.3) | 2.7 (0.8) | 2.7 (0.7) |
| Dispersion stability*4 | G | G | G | G | G | G | G | P |
| Conductivity (Scm$^{-1}$)*5 | 0.25 | 0.26 | 0.25 | 0.25 | 0.25 | 0.21 | 0.25 | 0.20 |

*1Molecular weight adjusting agent
*2Phase transfer catalyst
*3Shown by solid concentration (wt %) in polyaniline toluene dispersion (figures in parentheses in Table indicate polyaniline content (wt %)).
*4Polyaniline toluene dispersion judged visually after standing at room temperature for 6 months. Formation of precipitate indicated by "P (poor)", while non-formation indicated by "G (good)".
*5Pellets produced by compression molding machine measured by four-probe method.

As shown in Table I, it is clear that the Polyanilines 1 to 6 of the present invention are superior in yield and in dispersibility and dispersion stability with respect to toluene regardless of the conductivity being equal or greater than the Comparative Example of Polyaniline 8. Note that it is clear that Polyaniline 7 is not necessarily good in yield, but is superior in dispersion and dispersion stability with respect to toluene.

Examples 1 and 2 and Comparative Example 1

As shown in Table II, Polyaniline 1, 2 or 8 (0.05 g) and SBR (Nipol 1502 made by Nippon Zeon) (1 g) were dissolved in 15 g of toluene, then the toluene was distilled off in vacuo to obtain a polyaniline/SBR composite. The conductivity of the composite obtained is as shown in Table II.

TABLE II

| Formulation (parts by weight) | Ex. 1 | Ex. 2 | Comp. Ex. 1 |
|---|---|---|---|
| SBR | 100 | 100 | 100 |
| Polyaniline 1 | 5 | — | — |
| Polyaniline 2 | — | 5 | — |
| Polyaniline 3 | 0 | — | 5 |
| Conductivity (Scm$^{-1}$)*1 | 10$^{-5}$ | 10$^{-4}$ | 10$^{-12}$ |

*1Pressed in 15 × 15 × 0.2 cm mold at 100° C. for 10 minutes to prepare a rubber sheet which was then measured for electroconductivity according to JIS K7194 method (conditions: room temperature, Mitsubishi Chemical Rorester GP).*

Standard Example 1, Examples 3 and Comparative Examples 2 to 4

Fabrication of Dye-Sensitized Solar Cell

Fabrication of Photoelectrode

A transparent conductive glass substrate (made by Nippon Sheet Glass, conducting layer made of fluorine-doped tin oxide, FTO, 10Ω/☐) was coated on its surface with a paste prepared by mixing titanium dioxide powder (AEROXIDE $TiO_2$ P25, average particle size 25 nm, made by NIPPON AEROSIL), acetyl acetone, distilled water and a surfactant (Triton X100, made by Acros Organics) by a mortar, dried, then sintered at 460° C. for 45 minutes, whereby a mesoporous titanium oxide thin film was formed on the transparent conductive glass substrate. The glass substrate having this mesoporous titanium oxide thin film was dipped in an ethanol solution (concentration of $3 \times 10^{-4}$ mol/liter) of ruthenium complex dye (i.e., cis-di(thiocyanate)-N,N'-bis(2,2'-bipyridyl-4,4'-dicarboxylic acid) ruthenium (II) complex, Ruthenium 535, made by Solaronix) for 12 hours. The result was washed by acetonitrile, then dried in a dark location under a nitrogen flow to impregnate the mesoporous titanium dioxide thin film with the sensitizing dye. This was used as a photoelectrode.

Preparation of Electrolyte

Preparation of Liquid Electrolyte

Lithium iodide (0.5 mol/L), iodine (0.05 mol/L), 1,2-dimethyl-3-propylimidazolium iodide (0.3 mol/L) and 4-tert-butylpyridine (0.5 mol/L) were dissolved in 3-methoxypropionitrile to use a liquid electrolyte.

Preparation of Ion Liquid Electrolyte 1

Lithium iodide (0.1 mol/L), iodine (0.15 mol/L) and 4-tert-butylpyridine (0.5 mol/L) were dissolved in 1-methyl-3-propylimidazolium iodide to use an ion liquid electrolyte 1.

Preparation of Ion Liquid Electrolyte 2

Lithium iodide (0.1 mol/L), iodine (0.15 mol/L), 1-ethyl-3-methylimidazolium iodide and 4-tert-butylpyridine (0.5 mol/L) were dissolved in 1-ethyl-3-methylimidazolium bis(trifluoromethylsulfonyl)imide to use an ion liquid electrolyte 2.

Standard Example 1

A transparent conductive glass substrate (made by Nippon Sheet Glass, conductive surface made of fluorine-doped tin oxide, FTO, 10Ω/☐) was formed on its surface with a platinum thin film, having a thickness of 0.1 μm by spattering. This electrode was used as a counter electrode and was layered with the above photoelectrode fixed with 2 clips. The liquid electrolyte obtained above was introduced into the gap between the electrodes to obtain a cell of Standard Example 1.

Standard Example 2

Except for using the ion liquid electrolyte 1 as the electrolyte, the cell of Standard Example 2 was fabricated in the same manner as in Standard Example 1.

Standard Example 3

Except for using the ion liquid electrolyte 2 as the electrolyte, the cell of Standard Example 3 was fabricated in the same manner as in Standard Example 1.

Example 1

A transparent conductive glass substrate (made by Nippon Sheet Glass, conductive surface made of a fluorine-doped tin oxide, 10Ω/☐) was coated on its surface with the polyaniline toluene dispersion 1, followed by drying in vacuo to form polyaniline film. The thickness of the polyaniline film was similar to that of the platinum film of Standard Example 1. Except for using this electrode as the counter electrode, the cell of Example 1 was fabricated in the same manner as in Standard Example 1.

Example 2

Except for using the ion liquid electrolyte 1 as the electrolyte, the cell of Example 2 was fabricated in the same manner as in Example 1.

Example 3

Except for using the ion liquid electrolyte 2 as the electrolyte, the cell of Example 2 was fabricated in the same manner as in Example 1.

Example 4

A transparent conductive glass substrate (made by Nippon Sheet Glass, conductive surface made of a fluorine-doped tin oxide, 10Ω/☐) was coated on its surface with the polyaniline toluene dispersion 4, followed by drying in vacuo to form polyaniline film. The thickness of the polyaniline film was similar to that of the platinum film of Standard Example 1. Except for using this electrode as the counter electrode, the cell of Example 4 was fabricated in the same manner as in Standard Example 1.

Example 5

Except for using the ion liquid electrolyte 1 as the electrolyte, the cell of Example 5 was fabricated in the same manner as in Example 4.

Example 6

Except for using the ion liquid electrolyte 2 as the electrolyte, the cell of Example 6 was fabricated in the same manner as in Example 4.

Comparative Example 1

An electrochemical polymerization of aniline was carried out in a 0.1 mol/L aqueous hydrochloric acid solution containing 0.5 mol/L aniline dissolved therein at 0.5 mA for 2 hours using, a work electrode, a transparent conductive glass substrate (made by Nippon Sheet Glass, conductive surface made of a fluorine-doped tin oxide, 10Ω/☐) and, as a counter electrode, a platinum electrode to form a polyaniline film on a transparent conductive glass substrate. The thickness of the polyaniline film was similar to that of the platinum film of Standard Example 1. Except for using this electrode as the counter electrode, the cell of Example 4 was fabricated in the same manner as in Standard Example 1.

The thickness of the polyaniline film was similar to that of the platinum film of Standard Example 1. Except for using this electrode as the counter electrode, the cell of Example 4 was fabricated in the same manner as in Standard Example 1.

Comparative Example 2

Except for using the ion liquid electrolyte 1 as the electrolyte, the cell of Comparative Example 2 was fabricated in the same manner as in Comparative Example 1.

Comparative Example 3

Except for using the ion liquid electrolyte 2 as the electrolyte, the cell of Comparative Example 3 was fabricated in the same manner as in Comparative Example 1.

Comparative Example 4

A transparent conductive glass substrate (made by Nippon Sheet Glass, conductive surface made of a fluorine-doped tin oxide, 10Ω/□) was coated on its surface with the poly(3,4-ethylenedioxythiophene) water dispersion (Baytron P made by Bayer,), followed by drying in vacuo to form poly(3,4-ethylenedioxythiophene) film. The thickness of the poly(3,4-ethylenedioxythiophene) film was similar to that of the platinum film of Standard Example 1. Except for using this electrode as the counter electrode, the cell of Comparative Example 4 was fabricated in the same manner as in Standard Example 1.

Comparative Example 5

Except for using the ion liquid electrolyte 1 as the electrolyte, the cell of Comparative Example 5 was fabricated in the same manner as in Comparative Example 4.

Comparative Example 6

Except for using the ion liquid electrolyte 2 as the electrolyte, the cell of Comparative Example 6 was fabricated in the same manner as in Comparative Example 4.

Comparative Example 7

A transparent conductive glass substrate (made by Nippon Sheet Glass, conductive surface made of a fluorine-doped tin oxide, 10Ω/□) was coated on its surface with the poly(a-nilinesulfonic acid) water dispersion (Aquasave made by Mitsubishi Rayon), followed by drying in vacuo to form Aldrich film. The thickness of the Aldrich film was similar to that of the platinum film of Standard Example 1. Except for using this electrode as the counter electrode, the cell of Comparative Example 7 was fabricated in the same manner as in Standard Example 1.

Comparative Example 8

Except for using the ion liquid electrolyte 1 as the electrolyte, the cell of Comparative Example 8 was fabricated in the same manner as in Comparative Example 7.

Comparative Example 9

Except for using the ion liquid electrolyte 2 as the electrolyte, the cell of Comparative Example 9 was fabricated in the same manner as in Comparative Example 7.

Each test cell obtained above was irradiated with light from 500 W Xe lamp through an AM1.5 solar simulation filter and the photocurrent-photovoltage characteristics were measured with a digital source meter. The results are shown in Table III.

TABLE III

| | Jsc (mA/cm$^2$) | Voc (mV) | FF | η (%) |
|---|---|---|---|---|
| Standard Ex. 1 | 14.1 | 723 | 0.66 | 6.7 |
| Standard Ex. 2 | 7.8 | 681 | 0.62 | 3.3 |
| Standard Ex. 3 | 10.1 | 632 | 0.61 | 3.9 |
| Example 1 | 14.0 | 724 | 0.65 | 6.6 |
| Example 2 | 7.9 | 685 | 0.63 | 3.4 |
| Example 3 | 10.1 | 636 | 0.63 | 4.0 |
| Example 4 | 14.2 | 722 | 0.65 | 6.7 |
| Example 5 | 8.0 | 683 | 0.63 | 3.4 |
| Example 6 | 10.2 | 635 | 0.62 | 4.0 |
| Comp. Ex. 1 | 9.4 | 681 | 0.62 | 4.0 |
| Comp. Ex. 2 | 5.8 | 635 | 0.58 | 2.1 |
| Comp. Ex. 3 | 6.7 | 596 | 0.61 | 2.4 |
| Comp. Ex. 4 | 11.8 | 686 | 0.61 | 4.9 |
| Comp. Ex. 5 | 6.2 | 645 | 0.57 | 2.3 |
| Comp. Ex. 6 | 7.6 | 612 | 0.58 | 2.7 |
| Comp. Ex. 7 | 4.7 | 581 | 0.58 | 1.9 |
| Comp. Ex. 8 | 3.7 | 535 | 0.56 | 1.1 |
| Comp. Ex. 9 | 4.8 | 524 | 0.57 | 1.4 |

Jsc: Short-circuit photocurrent
Voc: Open-circuit photovoltage
FF: Fill factor
η: Energy conversion efficency As is clear from the results shown in Table III, the cell according to Examples 1 and 4 of the present invention exhibited the values of Jsc, Voc and η, under light irradiation, similar to the cell of Standard Example 1 using a platinum film as a counter electrode, whereas the cells of Comparative Examples 1, 4 and 7 using other conductive polymer thin films as counter electrodes have small values of Jsc, Voc and η.

As is clear from the results shown in Table III, the cell according to Examples 2 and 5 of the present invention exhibited the values of Jsc, Voc and η, under light irradiation, similar to the cell of Standard Example 2 using a platinum film as counter electrode, whereas the cells of Comparative Examples 2, 5 and 8 using other conductive polymer thin films as counter electrodes have small values of Jsc, Voc and η.

As is clear from the results shown in Table III, the cell according to Examples 3 and 6 of the present invention exhibited the values of Jsc, Voc and η, under light irradiation, similar to the cell of Standard Example 3 using a platinum film as counter electrode, whereas the cells of Comparative Examples 3, 6 and 9 using other conductive polymer thin films as counter electrodes have small values of Jsc, Voc and η.

As explained above, according to the present invention, it is possible to obtain a conductive polyaniline stably dispersed in an organic solvent at a high yield. This conductive polyaniline is stably dispersed in an organic solvent, and therefore, can easily form a conductive film or thin film by being coated or dried on a base material. The conductive film or thin film thus obtained is suitable for use for an antistatic material, a transparent conductive film, etc. Further, by mixing with a conventional polymer material, it may be converted to a conductive material. Further, when the conductive polyaniline dispersion stable in an organic solvent is used, a counter electrode having properties similar to, or greater than, those of conventional platinum thin layer on a substrate can be obtained at a lower cost and, therefore, can be advantageously used in, for example, a dye-sensitized solar cell.

The invention claimed is:

1. A photovoltaic device comprising (i) a photoelectrode composed of a transparent conducting layer and a metal oxide semiconductor mesoporous film, (ii) a counter electrode located opposite to the photoelectrode and (iii) an electrolyte layer containing a redox couple present between the both electrodes, said counter electrode being formed by a conductive substrate comprising, coated thereon, (A) polyaniline derived from polymerization of aniline or aniline derivative, (B) sulfonic acid and/or (C) an organic polymer having a protonic acid group, (D) a molecular weight adjusting agent selected from the group consisting of an aniline derivative having a substituent at the 4th position, a thiol compound, a disulfide compound, an α-methylstyrene dimer and mixtures thereof.

2. The photovoltaic device according to claim 1, being a dye-sensitized solar cell comprising a photosensitizing dye carried on the metal oxide semiconductor mesoporous film of the photoelectrode.

* * * * *